US010066689B2

United States Patent
Bhatti et al.

(10) Patent No.: US 10,066,689 B2
(45) Date of Patent: Sep. 4, 2018

(54) NOISE REDUCTION CLIP FOR BRAKE

(71) Applicants: Irfan A Bhatti, Farmington Hills, MI (US); Andrew M Moore, Royal Oak, MI (US)

(72) Inventors: Irfan A Bhatti, Farmington Hills, MI (US); Andrew M Moore, Royal Oak, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 15/386,679

(22) Filed: Dec. 21, 2016

(65) Prior Publication Data

US 2018/0172095 A1 Jun. 21, 2018

(51) Int. Cl.
*F16D 65/02* (2006.01)
*F16D 65/097* (2006.01)
*F16D 55/225* (2006.01)

(52) U.S. Cl.
CPC ........ *F16D 65/0977* (2013.01); *F16D 55/225* (2013.01)

(58) Field of Classification Search
CPC ............. F16D 65/0972; F16D 65/0971; F16D 65/0977; F16F 1/376
See application file for complete search history.

(56) References Cited

U.S. PATENT DOCUMENTS

| 4,803,112 | A | * | 2/1989 | Kakimoto | B32B 3/30 428/161 |
|---|---|---|---|---|---|
| 5,975,252 | A | * | 11/1999 | Suzuki | F16D 55/227 188/1.11 W |
| 6,223,866 | B1 | * | 5/2001 | Giacomazza | F16D 55/227 188/73.36 |
| 2005/0241897 | A1 | * | 11/2005 | Lelievre | F16D 65/0006 188/250 G |
| 2006/0289255 | A1 | * | 12/2006 | Adams | F16D 65/0006 188/218 XL |
| 2007/0290422 | A1 | * | 12/2007 | Akashi | F16F 1/3737 267/136 |
| 2008/0029356 | A1 | * | 2/2008 | Halasy-Wimmer | F16D 55/22655 188/73.45 |
| 2009/0243172 | A1 | * | 10/2009 | Ting | F16F 1/3732 267/141.1 |
| 2009/0277729 | A1 | * | 11/2009 | Kim | F16D 65/0972 188/73.38 |

(Continued)

FOREIGN PATENT DOCUMENTS

GB 2087996 A * 6/1982 ......... F16D 65/0006

*Primary Examiner* — Bradley T King
(74) *Attorney, Agent, or Firm* — Ralph E. Smith

(57) ABSTRACT

A noise reduction clip for a disc brake assembly includes inboard and outboard back walls and dampers. The inboard and outboard back walls are disposed between the caliper and a longitudinal end of the respective inboard or outboard brake pad. The brake pad side of the inboard and outboard back walls is in sliding contact with the longitudinal end of the respective inboard or outboard brake pad. The caliper side of the inboard and outboard back wall faces a respective inboard or outboard surface of the caliper. The inboard and outboard dampers are fixedly attached to the caliper side of the respective inboard or outboard back wall and configured to abut the respective inboard or outboard surface of the caliper. The inboard and outboard dampers are formed of a resilient material.

13 Claims, 5 Drawing Sheets

(56) References Cited

U.S. PATENT DOCUMENTS

2014/0374202 A1* 12/2014 Mahoudeaux ...... F16D 55/2262
188/250 E

* cited by examiner

NOISE REDUCTION CLIP FOR BRAKE

FIELD

The present disclosure relates to a pad abutment clip for reducing moan noise in a brake.

BACKGROUND

This section provides background information related to the present disclosure and is not necessarily prior art.

Vehicle disc brakes include a brake caliper, a rotor, and brake pads on opposite sides of the rotor. The rotor is coupled to a wheel of the vehicle for common rotation about a central axis. One type of brake caliper is a floating caliper, which typically includes an upper body (housing), a lower body (anchor bracket), and one or more hydraulic pistons configured to move the brake pads into contact with the rotor to decrease the rotational speed of the rotor. The upper body of the caliper moves axially relative to the lower body. Typically, the lower body of the caliper is fixedly mounted to a component of the vehicle that does not rotate about the central axis, such as a steering knuckle for example. Typically, the piston is disposed within a cylinder that is defined by an inboard member of the upper body of the caliper. The piston is axially slidable in the cylinder.

Typically the inboard brake pad is supported by the lower body between the piston and the rotor, and the outboard brake pad is supported by the lower body between the rotor and an outboard member of the upper body of the caliper. Typically, the piston is actuated to engage the inboard brake pad to slide the inboard brake pad axially along the lower body until the inboard brake pad comes into contact with the inboard side of the rotor. Continued actuation of the piston causes the upper body to be pulled inboard until the outboard brake pad contacts the outboard side of the rotor and the rotor is compressed between the inboard and outboard brake pads. Friction between the rotor and the brake pads generally converts rotational energy to heat, causing a decrease in rotational speed of the rotor, and thus the wheel.

Contact between the brake pads and the rotor sends vibrations through the brake pads that travel from the brake pads to the caliper and from the caliper to other parts of the vehicle. In some conditions, these vibrations cause audible noise, such as a moan or squeal during contact between the brake pads and rotor at low rotational speeds or in reverse for example. This low frequency, audible noise is typically referred to as brake moan. Operation of the brake in different conditions causes vibrations of different frequencies that can cause brake moan having different pitches and/or tones during the different conditions. Some operators and/or passengers of the vehicle find this brake moan undesirable.

SUMMARY

This section provides a general summary of the disclosure, and is not a comprehensive disclosure of its full scope or all of its features.

In accordance with an aspect of the present disclosure, a noise reduction clip for a disc brake assembly includes an inboard back wall, an inboard damper, and outboard back wall, and an outboard damper. The disc brake assembly includes a caliper, an inboard brake pad, and an outboard brake pad. The inboard back wall is configured to be disposed between the caliper and a longitudinal end of the inboard brake pad. The inboard back wall has a brake pad side and a caliper side. The brake pad side of the inboard back wall is configured to be in sliding contact with the longitudinal end of the inboard brake pad. The caliper side of the inboard back wall is configured to face an inboard surface of the caliper. The inboard damper is fixedly attached to the caliper side of the inboard back wall and configured to abut the inboard surface of the caliper. The inboard damper is formed of a resilient material. The outboard back wall is configured to be disposed between the caliper and a longitudinal end of the outboard brake pad. The outboard back wall has a brake pad side and a caliper side. The brake pad side of the outboard back wall is configured to be in sliding contact with the longitudinal end of the outboard brake pad. The caliper side of the outboard back wall is configured to face an outboard surface of the caliper. The outboard damper is fixedly attached to the caliper side of the outboard back wall and configured to abut the outboard surface of the caliper. The outboard damper is formed of a resilient material.

In accordance with an aspect of the present disclosure, the inboard and outboard dampers are formed of a rubber material.

In accordance with an aspect of the present disclosure, the inboard damper has a wedge-shaped cross-section such that a side of the inboard damper that abuts the inboard surface of the caliper is transverse to the inboard back wall and the outboard damper has a wedge-shaped cross-section such that a side of the outboard damper that abuts the outboard surface of the caliper is transverse to the outboard back wall.

In accordance with an aspect of the present disclosure, the wedge-shaped cross-section of the inboard damper narrows toward an upper end of the inboard damper and the wedge-shaped cross-section of the outboard damper narrows toward an upper end of the outboard damper.

In accordance with an aspect of the present disclosure, the side of the inboard damper that abuts the inboard surface of the caliper includes a plurality of grooves and the side of the outboard damper that abuts the outboard surface of the caliper includes a plurality of grooves.

In accordance with an aspect of the present disclosure, the side of the inboard damper that abuts the inboard surface of the caliper includes a plurality of protrusions that extend toward the inboard surface of the caliper, and the side of the outboard damper that abuts the outboard surface of the caliper includes a plurality of protrusions that extend toward the outboard surface of the caliper.

In accordance with an aspect of the present disclosure, a side of the inboard damper that abuts the inboard surface of the caliper includes a plurality of grooves, and a side of the outboard damper that abuts the outboard surface of the caliper includes a plurality of grooves.

In accordance with an aspect of the present disclosure, a side of the inboard damper that abuts the inboard surface of the caliper includes a plurality of protrusions that extend toward the inboard surface of the caliper, and a side of the outboard damper that abuts the outboard surface of the caliper includes a plurality of protrusions that extend toward the outboard surface of the caliper.

In accordance with an aspect of the present disclosure, the inboard damper has a rectangular-shaped cross-section such that a side of the inboard damper that abuts the inboard surface of the caliper is parallel to the inboard back wall, and the outboard damper has a rectangular-shaped cross-section such that a side of the outboard damper that abuts the outboard surface of the caliper is parallel to the outboard back wall.

In accordance with an aspect of the present disclosure, the side of the inboard damper that abuts the inboard surface of the caliper includes a plurality of protrusions, and the side of the outboard damper that abuts the outboard surface of the caliper includes a plurality of protrusions.

In accordance with an aspect of the present disclosure, the protrusions of the inboard damper extend toward the inboard surface of the caliper a decreasing amount with decreasing distance from a top end of the inboard back wall, and the protrusions of the outboard damper extend toward the outboard surface of the caliper a decreasing amount with decreasing distance from a top end of the outboard back wall.

In accordance with an aspect of the present disclosure, the inboard damper is overmolded onto the inboard back wall, and the outboard damper is overmolded onto the outboard back wall.

In accordance with an aspect of the present disclosure, the inboard damper does not extend beyond the caliper side of the inboard back wall, and the outboard damper does not extend beyond the caliper side of the outboard back wall.

In accordance with an aspect of the present disclosure, the inboard back wall is parallel to and spaced apart from the outboard back wall.

In accordance with an aspect of the present disclosure, the noise reduction clip further includes a connecting member fixedly joining the inboard back wall to the outboard back wall and spacing the inboard back wall apart from the outboard back wall.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

The following description of the preferred embodiment(s) is merely exemplary in nature and is in no way intended to limit the invention, its application, or uses.

The present teachings are directed toward a noise (i.e., moan) reduction clip for a vehicle disc brake assembly. The noise reduction clip generally reduces noise produced during operation of the disc brake assembly by damping vibrations produced by operation of the disc brake assembly and reducing transfer of vibrations through the disc brake assembly to other parts of the vehicle.

Figure 1:
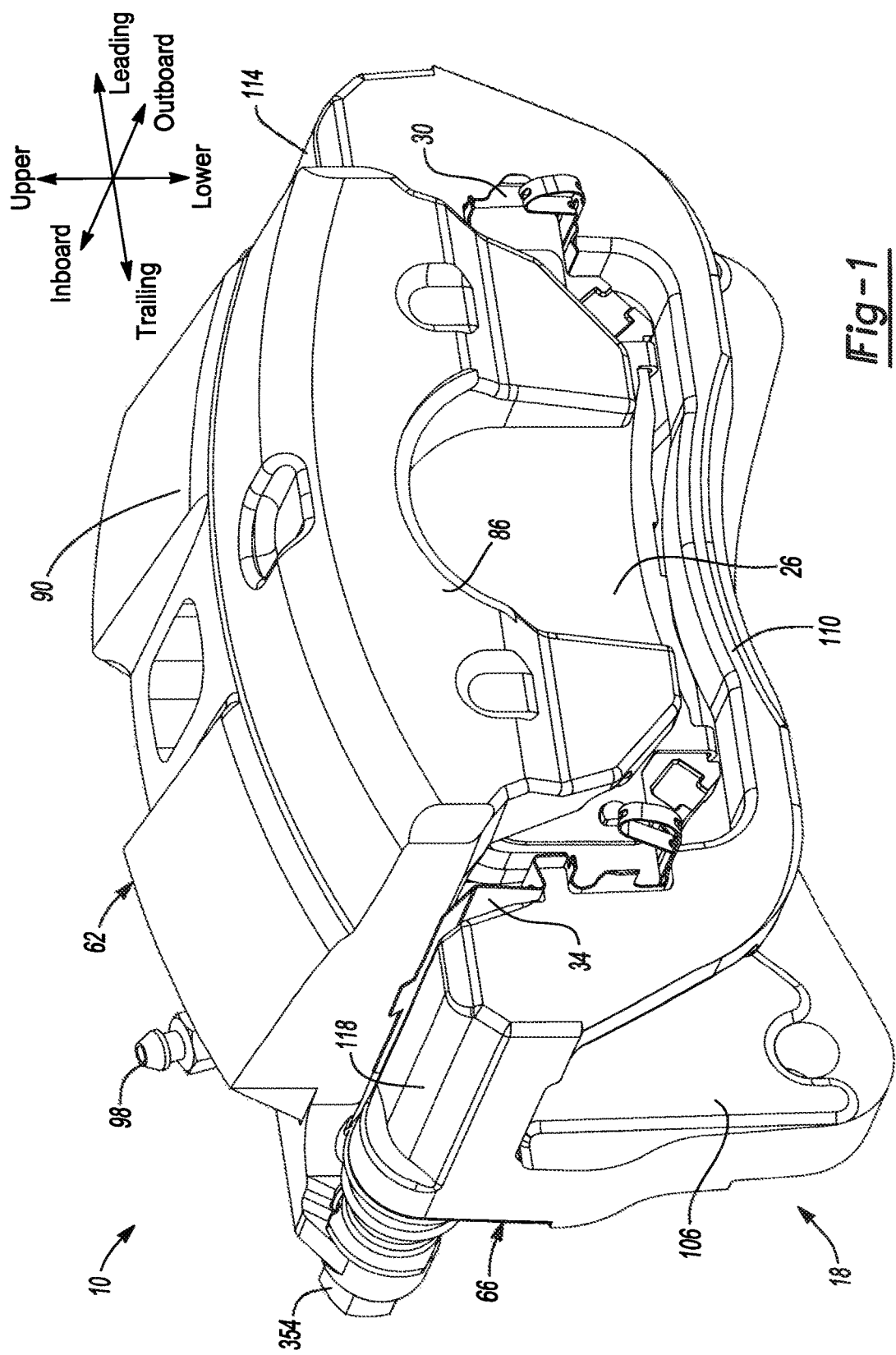
FIG. 1 is perspective view of a brake assembly in accordance with the present teachings.
Figure 2:
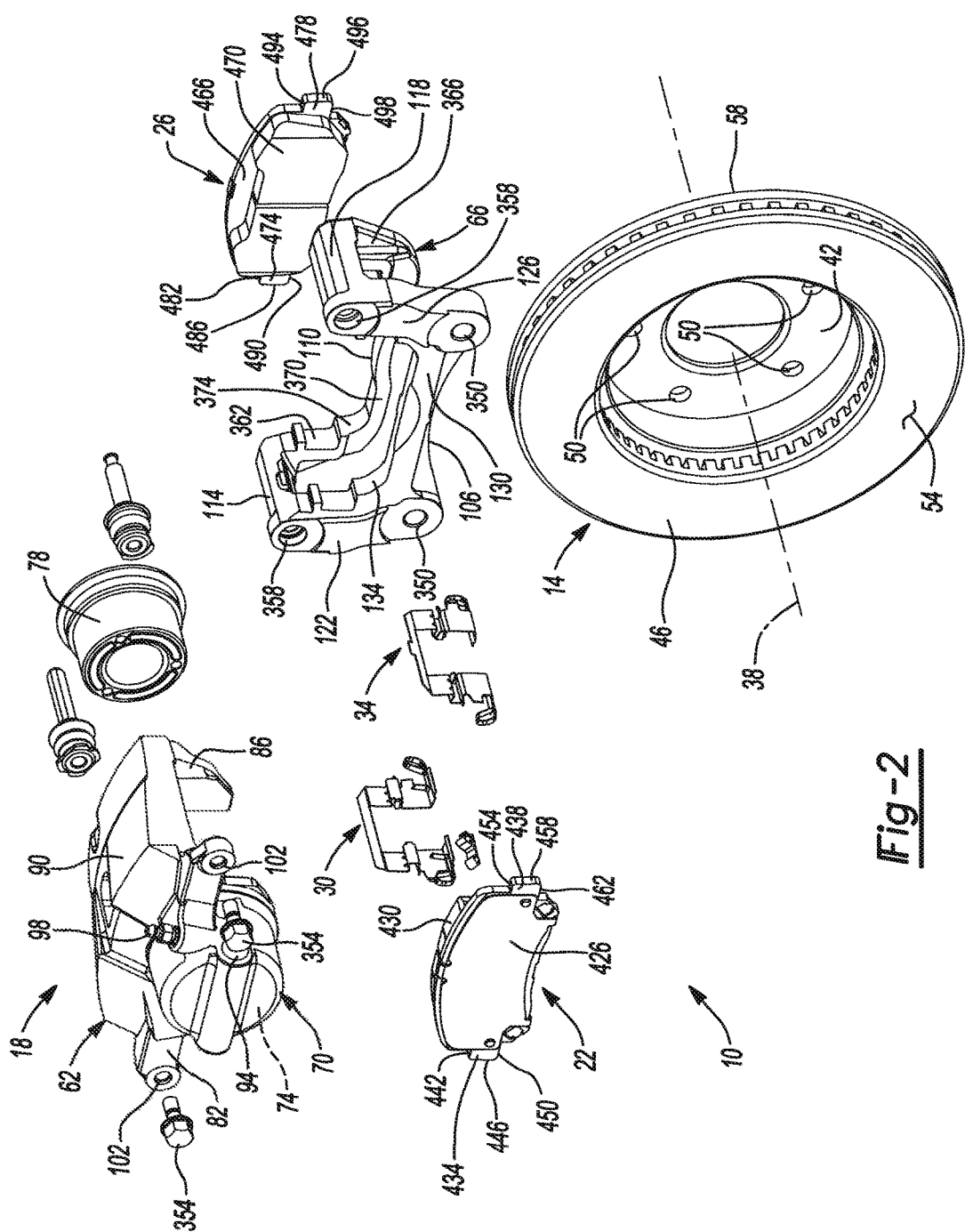
FIG. 2 is an exploded perspective view of the brake assembly of FIG. 1, illustrating a caliper, a set of brake pads, and a set of moan reduction clips of the brake assembly.
Figure 3:
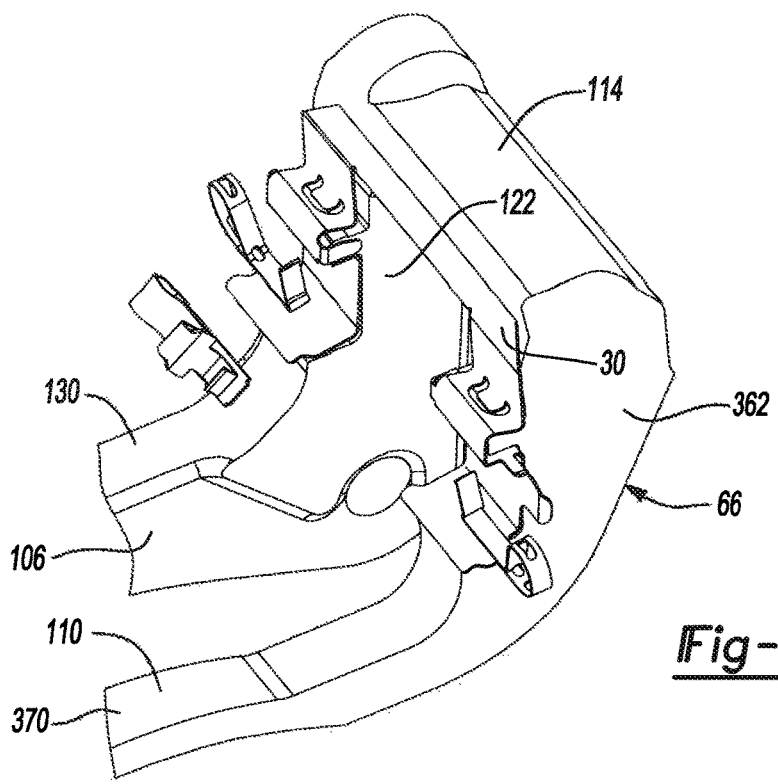
FIG. 3 is a perspective view of a portion of the brake assembly of FIG. 1.

With reference to FIGS. 1 and 2, a disc brake assembly 10 for use on a vehicle (not shown) is illustrated. The brake assembly 10 includes a rotor 14, a caliper 18, an inboard brake pad 22, an outboard brake pad 26, an at least one noise reduction clip. In the example provided, the brake assembly 10 includes a leading noise reduction clip 30 and a trailing noise reduction clip 34. The terms "leading" and "trailing" are used for ease of description with reference to the drawings and are not intended to limit the position of the components of the brake assembly 10 relative to the vehicle (not shown) or the rotational direction of the rotor 14.

The rotor 14 is a disc-shaped body that is configured to be mounted to a vehicle hub (not shown) for common rotation about a central axis 38 with a vehicle wheel (not shown). The rotor 14 includes a mounting portion 42 and a friction disc 46. The mounting portion 42 is configured to be mounted to the hub (not shown) in a conventional manner, such as lug bolts (not shown) received through lug bolt bores 50 that are equally spaced about the axis 38 and extend through the mounting portion 42 of the rotor 14. The friction disc 46 is fixedly coupled to the mounting portion 42 and extends radially outward therefrom. The friction disc 46 has an inboard surface 54 and an outboard surface 58 that are parallel and are configured to respectively face in inboard and outboard directions.

In the example provided, the caliper 18 is a floating-type caliper constructed in a typical manner and generally includes an upper body (also referred to as a housing) 62, a lower body (also referred to as an anchor bracket) 66, and a linear actuator 70. In the example provided, the linear actuator 70 is a hydraulic piston cylinder device that includes a cylinder 74 and a piston 78 slidably received in the cylinder 74. The terms "upper" and "lower" used herein are used for ease of description with respect to the drawings and are not intended to limit the orientation of the parts relative to the vehicle or in space. In an alternative construction, not specifically shown, the linear actuator 70 includes a plurality of pistons and cylinders similar to the piston 78 and cylinder 74.

The upper body 62 includes an inboard member 82, an outboard member 86 spaced apart from the inboard member 82, and an upper bridge member 90 that fixedly connects the inboard and outboard members 82, 86. The upper bridge member 90 connects the inboard and outboard members 82, 86 along an upper side of the upper body 62 and not along a lower side of the upper body 62. In the example provided, the inboard member 82 of the upper body 62 includes the cylinder 74 and a port 94 in fluid communication with the cylinder 74 to allow hydraulic fluid (not shown) to be supplied to and removed from the cylinder 74 to move the piston 78 axially within the cylinder 74 between a retracted position and an extended position. In an alternative construction, not specifically shown, the cylinder, or cylinders are defined by the outboard member 86 of the upper body 62.

The inboard member 82 of the upper body 62 also defines a bleed port 98 and mounting bores 102. The bleed port 98 is in fluid communication with the cylinder 74 and configured to permit fluid and air to be selectively bled from the cylinder 74. The mounting bores 102 are configured to couple the upper body 62 to the lower body 66 of the caliper 18, as described below. In the example provided, the inboard member 82 of the upper body 62 includes two mounting bores 102, one proximate to a leading side of the caliper 18 and one proximate to a trailing side of the caliper 18.

The lower body 66 includes an inboard member 106, an outboard member 110, a leading bridge member 114 and a trailing bridge member 118. The inboard member 106 of the lower body 66 includes a leading arm 122, a trailing arm 126, and a base 130. The base 130 of the inboard member 106 fixedly joins the lower ends of the leading and trailing arms 122, 126 of the inboard member 106. The leading and trailing arms 122, 126 are spaced apart by the base 130 and extend upward from the base 130, such that the inboard member 106 forms a generally "U" shaped channel 134 open toward an upper side of the inboard member 106.

With additional reference to FIGS. 3-6, the inboard member 106 of the example provided also includes a leading shelf 310, a leading lip 312, a trailing shelf 314, and a trailing lip 316. The leading shelf 310 and leading lip 312 protrude in the trailing direction and into the channel 134 from a surface 318 of the leading arm 122 that faces the trailing direction. The leading shelf 310 has an upward facing surface 322 that extends in the axial direction parallel to the axis 38. The leading lip 312 has a lower facing surface 326 that opposes the upward facing surface 322 of the leading shelf 310 and extends in the axial direction parallel to the axis 38, such that a portion of the surface 318 of the leading arm 122 is bordered in the upper and lower directions by the lower and upward facing surfaces 326, 322 respectively.

The trailing shelf 314 and trailing lip 316 protrude in the leading direction and into the channel 134 from a surface 334 of the trailing arm 126 that faces the leading direction. The trailing shelf 314 has an upward facing surface 338 that extends in the axial direction parallel to the axis 38. The trailing lip 316 has a lower facing surface 342 that opposes the upward facing surface 338 of the trailing shelf 314 and extends in the axial direction parallel to the axis 38, such that a portion of the surface 334 of the trailing arm 126 is bordered in the upper and lower directions by the lower and upward facing surfaces 342, 338 respectively.

The lower body 66 is configured to be fixedly mounted to a non-rotating component of the vehicle (not shown) that does not rotate about the axis 38, such as a steering knuckle for example. In the example provided, the lower body 66 is configured to be fixedly mounted to the non-rotating component (not shown), by bolts (not shown) received through the non-rotating component (not shown) and mounting bores 350 defined by the base 130 of the inboard member 106. In the example provided, there are two mounting bores 350, with one located proximate to the leading side of the base 130 and the other located proximate to the trailing side of the base 130.

The lower body 66 is also configured to be coupled to the upper body 62 to permit the upper body 62 to slide axially relative to the lower body 66, while preventing relative movement in other directions. In the example provided a bolt 354 (FIG. 2) is received through each of the mounting bores 102 of the upper body 62 and each bolt 354 threadably engages a mounting bore 358 (FIG. 2) in the upper end of a respective leading or trailing arm 122, 126 of the inboard member 106. Each bolt 354 has a non-threaded portion that permits the upper body 62 to slide axially along the bolts 354.

Returning to FIG. 2, the outboard member 110 of the lower body 66 includes a leading arm 362, a trailing arm 366, and a base 370. The base 370 of the outboard member 110 fixedly joins the lower ends of the leading and trailing arms 362, 366 of the outboard member 110. The leading and trailing arms 362, 366 are spaced apart by the base 370 and extend upward from the base 370, such that the outboard member 110 forms a generally "U" shaped channel 374 open toward an upper side of the outboard member 110.

Returning to FIGS. 3-6, in the example provided, the outboard member 110 also includes a leading shelf 378, a leading lip 382, a trailing shelf 386, and a trailing lip 390. The leading shelf 378 and leading lip 382 protrude in the trailing direction and into the channel 374 from a surface 394 of the leading arm 362 that faces the trailing direction. The leading shelf 378 has an upward facing surface 398 that extends in the axial direction parallel to the axis 38. The leading lip 382 has a lower facing surface 402 that opposes the upward facing surface 398 of the leading shelf 378 and extends in the axial direction parallel to the axis 38, such that a portion of the surface 394 of the leading arm 362 is bordered in the upper and lower directions by the lower and upward facing surfaces 402, 398, respectively.

The trailing shelf 386 and trailing lip 390 protrude in the leading direction and into the channel 374 from a surface 410 of the trailing arm 366 that faces the leading direction. The trailing shelf 386 has an upward facing surface 414 that extends in the axial direction parallel to the axis 38. The trailing lip 390 has a lower facing surface 418 that opposes the upward facing surface 414 of the trailing shelf 386 and extends in the axial direction parallel to the axis 38, such that a portion of the surface 410 of the trailing arm 366 is bordered in the upper and lower directions by the lower and upward facing surfaces 418, 414 respectively.

The leading bridge member 114 extends in the axial direction to fixedly connect the upper ends of the leading arms 122, 362. The trailing bridge member 118 extends in the axial direction to fixedly connect the upper ends of the trailing arms 126, 366. The friction disc 46 of the rotor 14 is configured to rotate through the space between the leading arms 122, 362, the trailing arms 126, 366, and the bases 130, 370 of the lower body 66.

Returning to FIG. 2, the inboard brake pad 22 includes a backing plate 426, a friction pad 430, a leading finger 434, and a trailing finger 438, and is generally located between the leading and trailing arms 122, 126 of the inboard member 106 of the lower body 66 and between the inboard member 82 of the upper body 62 and the rotor 14. The friction pad 430 is fixedly attached to the backing plate 426 and faces outboard. The inboard side of the backing plate 426 is configured to be engaged by the piston 78 during actuation of the linear actuator 70. The friction pad 430 of the inboard brake pad 22 is configured to engage the inboard surface 54 of the friction disc 46 during activation of the linear actuator 70.

The leading finger 434 is fixedly coupled to the backing plate 426 and extends in the leading direction therefrom to form one longitudinal end of the inboard brake pad 22. The leading finger 434 is received in between the leading lip 312 and the leading shelf 310. The leading finger 434 includes an upper surface 442, a leading surface 446, and a lower surface 450. The upper surface 442 opposes the lower facing surface 326 of the leading lip 312. The leading surface 446 opposes the surface 318 of the leading arm 122. The lower surface 450 opposes the upward facing surface 322 of the leading shelf 310.

The trailing finger 438 is fixedly coupled to the backing plate 426 and extends in the trailing direction therefrom to form the other longitudinal end of the inboard brake pad 22. The trailing finger 438 is received in between the trailing lip 316 and the trailing shelf 314. The trailing finger 438 includes an upper surface 454, a trailing surface 458, and a lower surface 462. The upper surface 454 opposes the lower facing surface 342 of the trailing lip 316. The trailing surface 458 opposes the surface 334 of the trailing arm 126. The lower surface 462 opposes the upward facing surface 338 of the trailing shelf 314.

The outboard brake pad 26 includes a backing plate 466, a friction pad 470, a leading finger 474, and a trailing finger 478, and is generally located between the leading and trailing arms 362, 366 of the outboard member 110 of the lower body 66 and between the rotor 14 and the outboard member 86 of the upper body 62. The friction pad 470 is fixedly attached to the backing plate 466 and faces inboard. The outboard side of the backing plate 466 is configured to be engaged by the outboard member 86 of the upper body 62 during actuation of the linear actuator 70. The friction pad 470 of the outboard brake pad 26 is configured to engage the outboard surface 58 of the friction disc 46 during activation of the linear actuator 70.

The leading finger 474 is fixedly coupled to the backing plate 466 and extends in the leading direction therefrom to form one longitudinal end of the outboard brake pad 26. The leading finger 474 is received in between the leading lip 382 and the leading shelf 378. The leading finger 474 includes an upper surface 482, a leading surface 486, and a lower surface 490. The upper surface 482 opposes the lower facing surface 402 of the leading lip 382. The leading surface 486 opposes the surface 394 of the leading arm 362. The lower surface 490 opposes the upward facing surface 398 of the leading shelf 378.

The trailing finger 478 is fixedly coupled to the backing plate 466 and extends in the trailing direction therefrom to form the other longitudinal end of the outboard brake pad 26. The trailing finger 478 is received in between the trailing lip 390 and the trailing shelf 386. The trailing finger 478 includes an upper surface 494, a trailing surface 496, and a lower surface 498. The upper surface 494 opposes the lower facing surface 418 of the trailing lip 390. The trailing surface 496 opposes the surface 410 of the trailing arm 366. The lower surface 498 opposes the upward facing surface 414 of the trailing shelf 386.

Returning to FIG. 4, the leading noise reduction clip 30 is generally located between the brake pads 22, 26 and the leading arms 122, 362 of the lower body 66 and is configured to inhibit and dampen transmission of vibrations from the brake pads 22, 26 to the caliper 18. In the example provided, the leading noise reduction clip 30 is formed from a single stamped metal sheet, to have an inboard portion 510, an outboard portion 514, and a connecting portion 518. The leading noise reduction clip 30 also includes an inboard damper 522 and an outboard damper 526 that are a resilient material (e.g., rubber) overmolded, respectively, onto the inboard and outboard portions 510, 514, as described below.

The inboard portion 510 includes a lower landing wall 530, a lower back wall 534, a middle landing wall 538, a forward wall 542, an upper landing wall 546, and an upper back wall 550. An upper facing side of the lower landing wall 530 opposes the lower surface 450 of the inboard brake pad 22, while the opposite, downward facing side of the lower landing wall 530 opposes the upward facing surface 322, such that the lower landing wall 530 is between the leading finger 434 and the leading shelf 310. In the example provided, the leading finger 434 is configured to slide along the lower landing wall 530 in the axial direction.

A side of the lower back wall 534, that faces the trailing direction, opposes the leading surface 446 of the inboard brake pad 22. The inboard damper 522 is fixedly attached to the opposite side of the lower back wall 534, that faces the leading direction. The inboard damper 522 abuts against the surface 318 of the leading arm 122. In the example provided, the inboard damper 522 is overmolded onto the lower back wall 534 and does not extend beyond the side of the lower back wall 534 that opposes the surface 318 of the leading arm 122. The inboard damper 522 is described in greater detail below.

The middle landing wall 538 extends in the trailing direction from the top of the lower back wall 534. A lower side of the middle landing wall 538 opposes the upper surface 442 of the leading finger 434. An upper side of the middle landing wall 538 opposes the lower facing surface 326.

The forward wall 542 extends upward from the trailing end of the middle landing wall 538. A leading side of the forward wall 542 opposes a trailing surface of the leading lip 312. In the example provided, a tab 554 extends from an outboard side of the forward wall 542 in the leading direction to overlap with an outboard surface of the leading lip 312 to inhibit movement of the leading noise reduction clip 30 in the inboard direction.

The upper landing wall 546 extends in the leading direction from the top of the forward wall 542. A lower side of the upper landing wall 546 opposes an upper surface of the leading lip 312. The upper back wall 550 extends upward from the leading end of the upper landing wall 546. A leading side of the upper landing wall 546 opposes a trailing side of the leading arm 122.

In the example provided, the outboard portion 514 is a mirror image of the inboard portion 510. Thus, the outboard portion 514 includes a lower landing wall 558, a lower back wall 562, a middle landing wall 566, a forward wall 570, an upper landing wall 574, and an upper back wall 578. An upper facing side of the lower landing wall 558 opposes the lower surface 490 of the outboard brake pad 26, while the opposite, downward facing side of the lower landing wall 558 opposes the upward facing surface 398, such that the lower landing wall 558 is between the leading finger 474 and the leading shelf 378. In the example provided, the leading finger 474 is configured to slide along the lower landing wall 558 in the axial direction.

A side of the lower back wall 562, that faces the trailing direction, opposes the leading surface 486 of the outboard brake pad 26. The outboard damper 526 is fixedly attached to the opposite side of the lower back wall 562, that faces the leading direction. The outboard damper 526 abuts against the surface 394 of the leading arm 362. In the example provided, the outboard damper 526 is overmolded onto the lower back wall 562 and does not extend beyond the side of the lower back wall 562 that opposes the surface 394 of the leading arm 362. The outboard damper 526 is similar to the inboard damper 522 described in greater detail below.

The middle landing wall 566 extends in the trailing direction from the top of the lower back wall 562. A lower side of the middle landing wall 566 opposes the upper surface 482 of the leading finger 474. An upper side of the middle landing wall 566 opposes the lower facing surface 402.

The forward wall 570 extends upward from the trailing end of the middle landing wall 566. A leading side of the forward wall 570 opposes a trailing surface of the leading lip 382. In the example provided, a tab 582 extends from an inboard side of the forward wall 570 in the leading direction to overlap with an inboard surface of the leading lip 382 to inhibit movement of the leading noise reduction clip 30 in the outboard direction.

The upper landing wall 574 extends in the leading direction from the top of the forward wall 570. A lower side of the upper landing wall 574 opposes an upper surface of the leading lip 382. The upper back wall 578 extends upward from the leading end of the upper landing wall 574. A leading side of the upper landing wall 574 opposes a trailing side of the leading arm 362.

The connecting portion 518 extends axially between the tops of the upper back walls 550, 578 to fixedly join the inboard and outboard portions 510, 514. A leading side of the connecting portion 518 opposes a trailing side of the upper bridge member 90.

In an alternative construction, not specifically shown, the leading noise reduction clip 30 does not include the connecting portion 518 and the inboard portion 510 is separate from the outboard portion 514.

Figure 6:
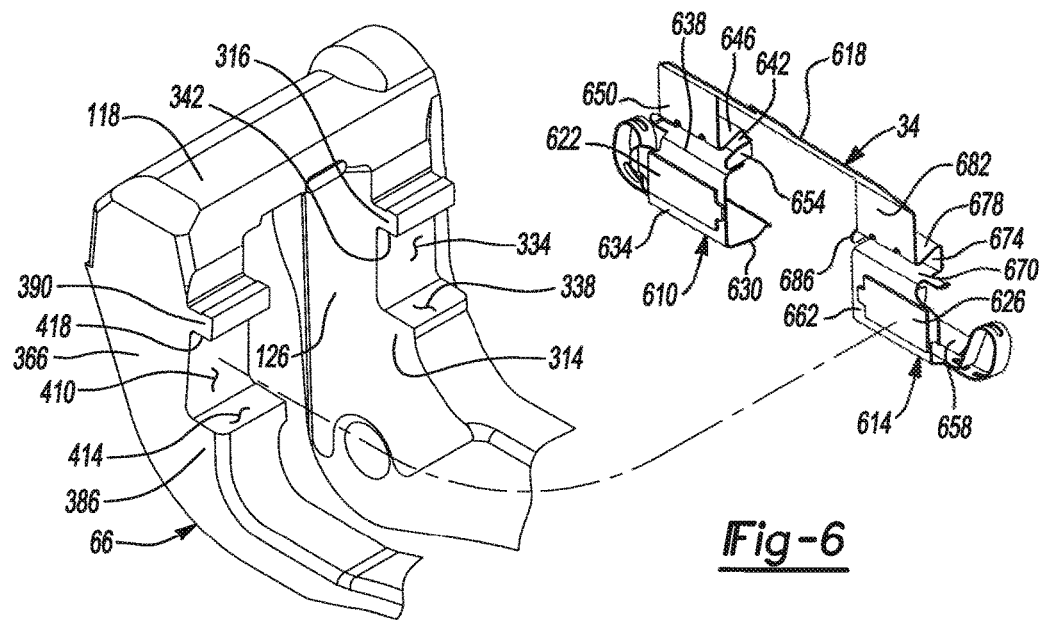
FIG. 6 is a perspective view similar to FIG. 5, illustrating another one of the moan reduction clips exploded off of a corresponding portion of the caliper.

With additional reference to FIG. 6, the trailing noise reduction clip 34 is similar to the leading noise reduction clip 30. The trailing noise reduction clip 34 is generally located between the brake pads 22, 26 and the trailing arms 126, 366 of the lower body 66 and is configured to inhibit and dampen transmission of vibrations from the brake pads 22, 26 to the caliper 18. In the example provided, the trailing noise reduction clip 34 is formed from a single stamped metal sheet, to have an inboard portion 610, an outboard portion 614, and a connecting portion 618. The trailing noise reduction clip also includes an inboard damper 622 and an outboard damper 626 that are a resilient material (e.g., rubber) overmolded, respectively, onto the inboard and outboard portions 610, 614, as described below.

The inboard portion 610 includes a lower landing wall 630, a lower back wall 634, a middle landing wall 638, a forward wall 642, an upper landing wall 646, and an upper back wall 650. An upper facing side of the lower landing wall 630 opposes the lower surface 462 of the inboard brake pad 22, while the opposite, downward facing side of the lower landing wall 630 opposes the upward facing surface 338, such that the lower landing wall 630 is between the trailing finger 438 and the trailing shelf 314. In the example provided, the trailing finger 438 is configured to slide along the lower landing wall 630 in the axial direction.

A side of the lower back wall 634, that faces the leading direction, opposes the trailing surface 458 of the inboard brake pad 22. The inboard damper 622 is fixedly attached to the opposite side of the lower back wall 634, that faces the trailing direction. The inboard damper 622 abuts against the surface 334 of the trailing arm 126. In the example provided, the inboard damper 622 is overmolded onto the lower back wall 634 and does not extend beyond the side of the lower back wall 634 that opposes the surface 334 of the trailing arm 126. The inboard damper 622 is described in greater detail below.

The middle landing wall 638 extends in the leading direction from the top of the lower back wall 634. A lower side of the middle landing wall 638 opposes the upper surface 454 of the trailing finger 438. An upper side of the middle landing wall 638 opposes the lower facing surface 342.

The forward wall 642 extends upward from the leading end of the middle landing wall 638. A trailing side of the forward wall 642 opposes a leading surface of the trailing lip 316. In the example provided, a tab 654 extends from an outboard side of the forward wall 642 in the trailing direction to overlap with an outboard surface of the trailing lip 316 to inhibit movement of the trailing noise reduction clip 34 in the inboard direction.

The upper landing wall 646 extends in the trailing direction from the top of the forward wall 642. A lower side of the upper landing wall 646 opposes an upper surface of the trailing lip 316. The upper back wall 650 extends upward from the trailing end of the upper landing wall 646. A trailing side of the upper landing wall 646 opposes a leading side of the trailing arm 126.

In the example provided, the outboard portion 614 is a mirror image of the inboard portion 610. Thus, the outboard portion 614 includes a lower landing wall 658, a lower back wall 662, a middle landing wall 670, a forward wall 674, an upper landing wall 678, and an upper back wall 682. An upper facing side of the lower landing wall 658 opposes the lower surface 498 of the outboard brake pad 26, while the opposite, downward facing side of the lower landing wall 658 opposes the upward facing surface 414, such that the lower landing wall 658 is between the trailing finger 478 and the trailing shelf 386. In the example provided, the trailing finger 478 is configured to slide along the lower landing wall 658 in the axial direction.

A side of the lower back wall 662, that faces the leading direction, opposes the trailing surface 496 of the outboard brake pad 26. The outboard damper 626 is fixedly attached to the opposite side of the lower back wall 662, that faces the trailing direction. The outboard damper 626 abuts against the surface 410 of the trailing arm 366. In the example provided, the outboard damper 626 is overmolded onto the lower back wall 662 and does not extend beyond the side of the lower back wall 662 that opposes the surface 410 of the trailing arm 366. The outboard damper 626 is similar to the inboard damper 622 described in greater detail below.

The middle landing wall 670 extends in the leading direction from the top of the lower back wall 662. A lower side of the middle landing wall 670 opposes the upper surface 494 of the trailing finger 478. An upper side of the middle landing wall 670 opposes the lower facing surface 418.

The forward wall 674 extends upward from the leading end of the middle landing wall 670. A trailing side of the forward wall 674 opposes a leading surface of the trailing lip 390. In the example provided, a tab 686 extends from an inboard side of the forward wall 674 in the trailing direction to overlap with an inboard surface of the trailing lip 390 to inhibit movement of the trailing noise reduction clip 34 in the outboard direction.

The upper landing wall 678 extends in the trailing direction from the top of the forward wall 674. A lower side of the upper landing wall 678 opposes an upper surface of the trailing lip 390. The upper back wall 682 extends upward from the trailing end of the upper landing wall 678. A trailing side of the upper landing wall 678 opposes a leading side of the trailing arm 366.

The connecting portion 618 extends axially between the tops of the upper back walls 650, 682 to fixedly join the inboard and outboard portions 610, 614. A trailing side of the connecting portion 618 opposes a leading side of the upper bridge member 90.

In an alternative construction, not specifically shown, the trailing noise reduction clip 34 does not include the connecting portion 618 and the inboard portion 610 is separate from the outboard portion 614.

Figure 7:
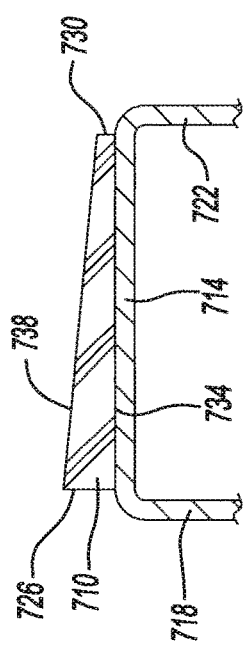
FIG. 7 is a sectional view of a portion of the moan reduction clip of FIG. 6, as taken along line 7-7 shown in FIG. 6.

With additional reference to FIG. 7, a cross-sectional view of one of the dampers 522, 526, 622, 626 and part of one of the noise reduction clips 30, 34 is illustrated. The one of the dampers 522, 526, 622, 626 is generically indicated with reference numeral 710. The one of the lower back walls 534, 562, 634, 662 is generically indicated with reference numeral 714, the one of the lower landing walls 530, 558, 630, 658 is generically indicated with reference numeral 718, and the one of the middle landing walls 538, 566, 638, 670 is generically indicated with reference numeral 722. Thus, it is understood that while the cross-section of the damper 710 illustrated as taken along line 7-7 (shown in FIG. 6) through the outboard damper 626, the other dampers 522, 526, 622 have similar cross-sections.

Figure 4:
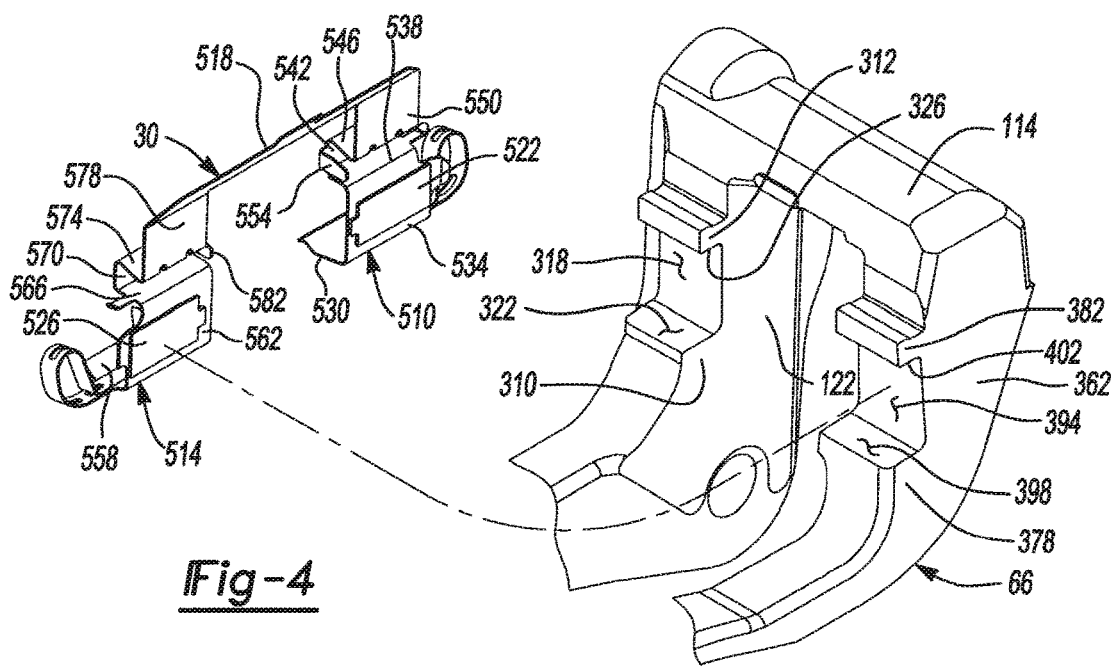
FIG. 4 is a perspective view similar to FIG. 3, illustrating one of the moan reduction clips exploded off of a corresponding portion of the caliper.
Figure 5:
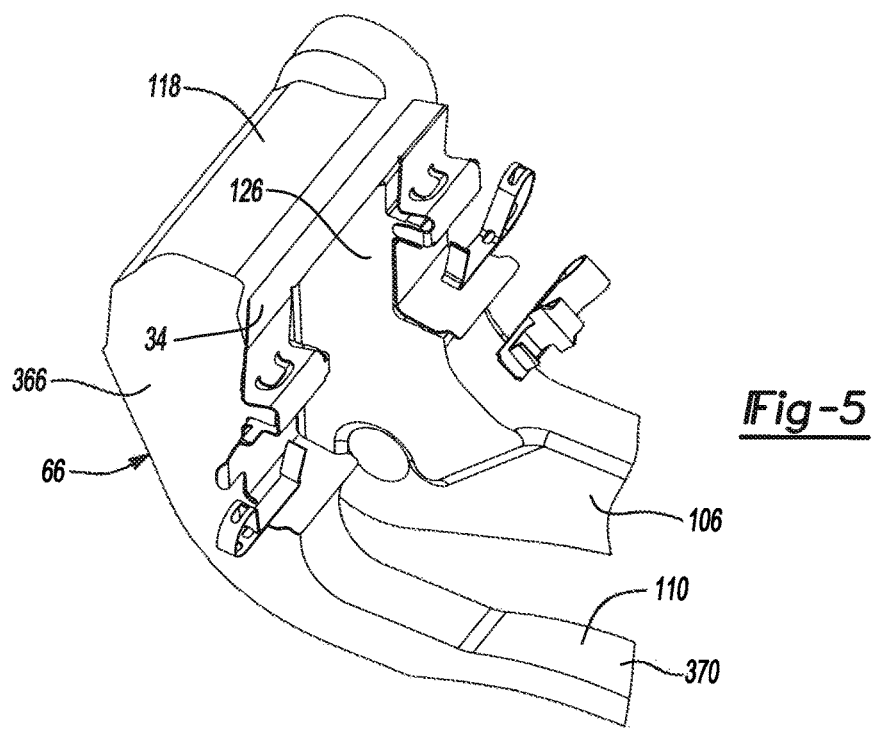
FIG. 5 is a perspective view of a different portion of the brake assembly of FIG. 1.

In the example provided, the damper 710 has a generally wedge shaped cross-section. The damper 710 narrows from a lower end 726 of the damper 710 to an upper end 730 of the damper 710. In the example provided, the side of the damper 710 that makes up the base of the wedge shape (i.e., base side 734) is fixedly attached to the lower back wall 714, while the other side of the damper 710 (i.e., angled side 738) makes up the angled side (e.g., hypotenuse side) of the wedge shape and opposes and abuts the surface 318, 334, 394, or 410 of the corresponding leading arm 122, 362 or trailing arm 126, 366 (FIGS. 4 and 6). In the example provided, the damper 710 has a solid cross-section and the angled side 738 does not include indentations or protrusions.

Figure 8:
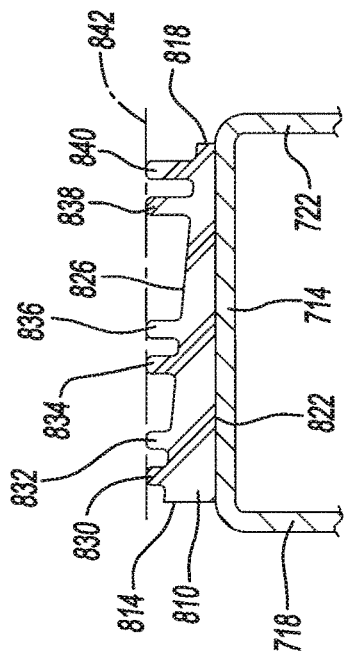
FIG. 8 is a sectional view similar to FIG. 7, illustrating a moan reduction clip of a second construction in accordance with the present teachings.

With additional reference to FIG. 8, a second construction of one of the dampers 522, 526, 622, 626 is illustrated and generically indicated by reference numeral 810. The damper 810 is similar to the damper 710, except as otherwise shown or described herein. In the example provided, the damper 810 has a generally wedge shaped cross-section. The damper 810 narrows from a lower end 814 of the damper 810 to an upper end 818 of the damper 810. In the example provided, the side of the damper 810 that makes up the base of the wedge shape (i.e., base side 822) is fixedly attached to the lower back wall 714, while the other side of the damper 810 (i.e., angled side 826) makes up the angled side (e.g., hypotenuse side) of the wedge shape and opposes the surface 318, 334, 394, or 410 of the corresponding leading arm 122, 362 or trailing arm 126, 366 (FIGS. 4 and 6). In the example provided, the portion of the damper 810 that forms the wedge shape has a solid cross-section, but a plurality of protrusions 830, 832, 834, 836, 838, 840 extend from the angled side 826. In the example provided, the protrusions 830, 832, 834, 836, 838, 840 extend outward from the angled side 826 a greater distance with greater distance from the lower end 814, such that the protrusions 830, 832, 834, 836, 838, 840 all extend outward from the angled side 826 to terminate at a plane 842 that is parallel to the lower back wall 714. The protrusions 830, 832, 834, 836, 838, 840 extend longitudinally across the damper 810. In the example provided, the protrusions 830, 832, 834, 836, 838, 840 are spaced apart in pairs, with the lower pair of protrusions 830, 832 being proximate to the lower end 814, the upper pair of protrusions 838, 840 being proximate to the upper end 818, and the middle pair of protrusions 834, 836 being between the upper and lower pairs of protrusions 830, 832, 838, 840. In alternate constructions, not specifically shown, the distance between the protrusions 830, 832, 834, 836, 838, 840 and/or the height and/or the location of the protrusions 830, 832, 834, 836, 838, 840 can be different to tune the damper 810 for damping specific vibrational frequencies.

Figure 9:
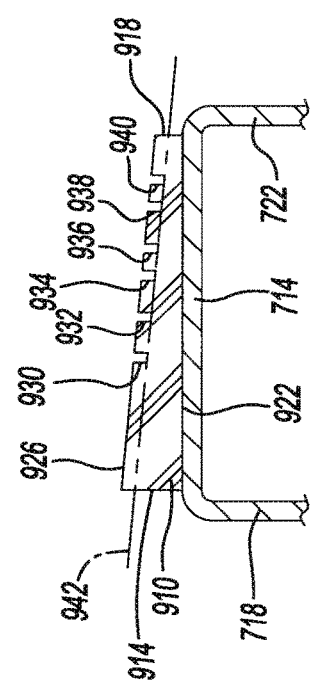
FIG. 9 is a sectional view similar to FIG. 7, illustrating a moan reduction clip of a third construction in accordance with the present teachings.

With additional reference to FIG. 9, a third construction of one of the dampers 522, 526, 622, 626 is illustrated and generically indicated by reference numeral 910. The damper 910 is similar to the damper 710, except as otherwise shown or described herein. In the example provided, the damper 910 has a generally wedge shaped cross-section. The damper 910 narrows from a lower end 914 of the damper 910 to an upper end 918 of the damper 910. In the example provided, the side of the damper 910 that makes up the base of the wedge shape (i.e., base side 922) is fixedly attached to the lower back wall 714, while the other side of the damper 910 (i.e., angled side 926) makes up the angled side (e.g., hypotenuse side) of the wedge shape and opposes the surface 318, 334, 394, or 410 of the corresponding leading arm 122, 362 or trailing arm 126, 366 (FIGS. 4 and 6). In the example provided, the portion of the damper 910 that forms the wedge shape has a solid cross-section, except for a plurality of indentations or grooves 930, 932, 934, 936, 938, 940 that are formed into the angled side 926. In the example provided, the grooves 930, 932, 934, 936, 938, 940 extend inward from the angled side 926 an equal distance, such that the grooves 930, 932, 934, 936, 938, 940 all extend inward from the angled side 926 to terminate at a plane 942 that is parallel to the angled side 926. The grooves 930, 932, 934, 936, 938, 940 extend longitudinally across the damper 910. In the example provided, the grooves 930, 932, 934, 936, 938, 940 are spaced apart in pairs, with the lower pair of grooves 930, 932 being proximate to the lower end 914, the upper pair of grooves 938, 940 being proximate to the upper end 918, and the middle pair of grooves 934, 936 being between the upper and lower pairs of grooves 930, 932, 938, 940. In alternate constructions, not specifically shown, the distance between the grooves 930, 932, 934, 936, 938, 940 and/or the depth and/or the location of the grooves 930, 932, 934, 936, 938, 940 can be different to tune the damper 910 for damping specific vibrational frequencies.

Figure 10:
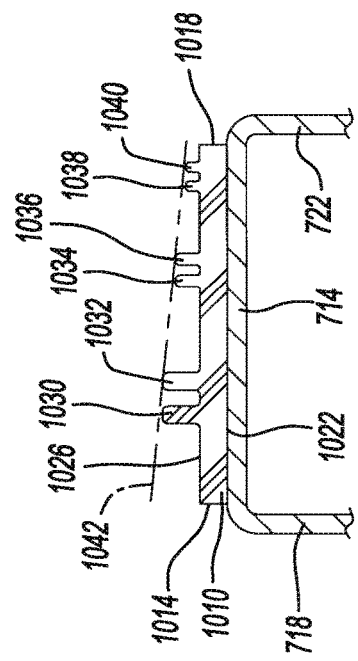
FIG. 10 is a sectional view similar to FIG. 7 illustrating a moan reduction clip of a fourth construction in accordance with the present teachings.

With additional reference to FIG. 10, a fourth construction of one of the dampers 522, 526, 622, 626 is illustrated and generically indicated by reference numeral 1010. The damper 1010 is similar to the damper 710, except as otherwise shown or described herein. In the example provided, the damper 1010 has a rectangular shaped cross-section, such that a lower end 1014 of the damper 1010 and an upper end 1018 of the damper 1010 extend from a base side 1022 of the damper 1010 an equal distance. The base side 1022 is fixedly attached to the lower back wall 714, while the other side of the damper 1010 (i.e., outer side 1026) extends between the upper end 1018 and the lower end 1014, parallel to the base side 1022, and opposes the surface 318, 334, 394, or 410 of the corresponding leading arm 122, 362 or trailing arm 126, 366 (FIGS. 4 and 6). In the example provided, the portion of the damper 1010 that forms the rectangular shape has a solid cross-section, but a plurality of protrusions 1030, 1032, 1034, 1036, 1038, 1040 extend from the outer side 1026. In the example provided, the protrusions 1030, 1032, 1034, 1036, 1038, 1040 extend outward from the outer side 1026 a lesser distance with greater distance from the lower end 1014, such that the protrusions 1030, 1032, 1034, 1036, 1038, 1040 all extend outward from the outer side 1026 to terminate at a plane 942 that is transverse to the lower back wall 714. The plane 942 and the lower back wall 714 form an angle that opens toward the lower end 1014 of the damper 1010. The protrusions 1030, 1032, 1034, 1036, 1038, 1040 extend longitudinally across the damper 1010. In the example provided, the protrusions 1030, 1032, 1034, 1036, 1038, 1040 are spaced apart in pairs, with the lower pair of protrusions 1030, 1032 being proximate to the lower end 1014, the upper pair of protrusions 1038, 1040 being proximate to the upper end 1018, and the middle pair of protrusions 1034, 1036 being between the upper and lower pairs of protrusions 1030, 1032, 1038, 1040. In alternate constructions, not specifically shown, the distance between the protrusions 1030, 1032, 1034, 1036, 1038, 1040 and/or the height and/or the location of the protrusions 1030, 1032, 1034, 1036, 1038, 1040 can be different to tune the damper 1010 for damping specific vibrational frequencies. In an alternative construction, not specifically shown, the damper 1010 does not include the protrusions 1030, 1032, 1034, 1036, 1038, 1040.

Thus, the noise reduction clips 30 and 34 reduce brake moan by damping transmission of vibrations from the brake pads 22, 26 to the caliper 18.

What is claimed is:

1. A noise reduction clip for a disc brake assembly, the disc brake assembly having a caliper, an inboard brake pad, and an outboard brake pad, the noise reduction clip comprising:
   an inboard back wall configured to be disposed between the caliper and a longitudinal end of the inboard brake pad, the inboard back wall having a brake pad side and a caliper side, the brake pad side of the inboard back wall being configured to be in sliding contact with the longitudinal end of the inboard brake pad, the caliper side of the inboard back wall being configured to face an inboard surface of the caliper;
   an outboard back wall configured to be disposed between the caliper and a longitudinal end of the outboard brake pad, the outboard back wall having a brake pad side and a caliper side, the brake pad side of the outboard back wall being configured to be in sliding contact with the longitudinal end of the outboard brake pad, the caliper side of the outboard back wall being configured to face an outboard surface of the caliper; and
   at least one damper fixedly attached to the caliper side of at least one of the inboard back wall and the outboard back wall and configured to abut the caliper, the at least one damper being formed of a resilient material,
   wherein the at least one damper has a wedge-shaped cross-section such that a side of the at least one damper that abuts the caliper is arranged at an angle to one of the inboard back wall and the outboard back wall.

2. The noise reduction clip of claim 1, wherein the at least one damper is formed of a rubber material.

3. The noise reduction clip of claim 1, wherein a side of the at least one damper that abuts the caliper includes a plurality of grooves.

4. The noise reduction clip of claim 1, wherein a side of the at least one damper that abuts the caliper includes a plurality of protrusions that extend toward the caliper.

5. The noise reduction clip of claim 1, wherein the inboard back wall is parallel to and spaced apart from the outboard back wall.

6. The noise reduction clip of claim 5, further comprising a connecting member fixedly joining the inboard back wall to the outboard back wall and spacing the inboard back wall apart from the outboard back wall.

7. A noise reduction clip for a disc brake assembly, the disc brake assembly having a caliper, an inboard brake pad, and an outboard brake pad, the noise reduction clip comprising:
   an inboard back wall configured to be disposed between the caliper and a longitudinal end of the inboard brake pad, the inboard back wall having a brake pad side and a caliper side, the brake pad side of the inboard back wall being configured to be in sliding contact with the longitudinal end of the inboard brake pad, the caliper side of the inboard back wall being configured to face an inboard surface of the caliper;
   an inboard damper fixedly attached to the caliper side of the inboard back wall and configured to abut the inboard surface of the caliper, the inboard damper being formed of a resilient material;
   an outboard back wall configured to be disposed between the caliper and a longitudinal end of the outboard brake pad, the outboard back wall having a brake pad side and a caliper side, the brake pad side of the outboard back wall being configured to be in sliding contact with the longitudinal end of the outboard brake pad, the caliper side of the outboard back wall being configured to face an outboard surface of the caliper; and
   an outboard damper fixedly attached to the caliper side of the outboard back wall and configured to abut the outboard surface of the caliper, the outboard damper being formed of a resilient material, wherein the inboard damper has a wedge-shaped cross-section such that a side of the inboard damper that abuts the inboard surface of the caliper is arranged at an angle relative to the inboard back wall, wherein the outboard damper has a wedge-shaped cross-section such that a side of the outboard damper that abuts the outboard surface of the caliper is arranged at an angle relative to the outboard back wall.

8. The noise reduction clip of claim 7, wherein the wedge-shaped cross-section of the inboard damper narrows toward an upper end of the inboard damper and the wedge-shaped cross-section of the outboard damper narrows toward an upper end of the outboard damper.

9. The noise reduction clip of claim 7, wherein the side of the inboard damper that abuts the inboard surface of the caliper includes a plurality of grooves, wherein the side of the outboard damper that abuts the outboard surface of the caliper includes a plurality of grooves.

10. The noise reduction clip of claim 7, wherein the side of the inboard damper that abuts the inboard surface of the caliper includes a plurality of protrusions that extend toward the inboard surface of the caliper, wherein the side of the outboard damper that abuts the outboard surface of the caliper includes a plurality of protrusions that extend toward the outboard surface of the caliper.

11. The noise reduction clip of claim 7, wherein the inboard damper is overmolded onto the inboard back wall, wherein the outboard damper is overmolded onto the outboard back wall.

12. The noise reduction clip of claim 7, wherein the inboard damper does not extend beyond the inboard back wall in an outboard direction, wherein the outboard damper does not extend beyond the outboard back wall in an inboard direction.

13. A noise reduction clip for a disc brake assembly, the disc brake assembly having a caliper, an inboard brake pad, and an outboard brake pad, the noise reduction clip comprising:
   an inboard back wall configured to be disposed between the caliper and a longitudinal end of the inboard brake pad, the inboard back wall having a brake pad side and a caliper side, the brake pad side of the inboard back wall being configured to be in sliding contact with the longitudinal end of the inboard brake pad, the caliper side of the inboard back wall being configured to face an inboard surface of the caliper;

an inboard damper fixedly attached to the caliper side of the inboard back wall and configured to abut the inboard surface of the caliper, the inboard damper being formed of a resilient material;

an outboard back wall configured to be disposed between the caliper and a longitudinal end of the outboard brake pad, the outboard back wall having a brake pad side and a caliper side, the brake pad side of the outboard back wall being configured to be in sliding contact with the longitudinal end of the outboard brake pad, the caliper side of the outboard back wall being configured to face an outboard surface of the caliper; and an outboard damper fixedly attached to the caliper side of the outboard back wall and configured to abut the outboard surface of the caliper, the outboard damper being formed of a resilient material, wherein the inboard damper has a rectangular-shaped cross-section such that a side of the inboard damper that abuts the inboard surface of the caliper is parallel to the inboard back wall, wherein the outboard damper has a rectangular-shaped cross-section such that a side of the outboard damper that abuts the outboard surface of the caliper is parallel to the outboard back wall, wherein the side of the inboard damper that abuts the inboard surface of the caliper includes a plurality of protrusions, wherein the side of the outboard damper that abuts the outboard surface of the caliper includes a plurality of protrusions, wherein the protrusions of the inboard damper extend toward the inboard surface of the caliper a decreasing amount with decreasing distance from a top end of the inboard back wall, wherein the protrusions of the outboard damper extend toward the outboard surface of the caliper a decreasing amount with decreasing distance from a top end of the outboard back wall.

* * * * *